United States Patent [19]

Delgado

[11] 4,105,429
[45] Aug. 8, 1978

[54] METHOD AND APPARATUS FOR PRECISION FORMING OF PLASTIC MATERIALS SUCH AS GLASS TO PRECISE DIMENSIONS FROM SHEET MATERIAL

[76] Inventor: Manuel M. Delgado, 12624 Ocaso, La Mirada, Calif. 90638

[21] Appl. No.: 792,773

[22] Filed: May 2, 1977

[51] Int. Cl.² ............................................ C03B 23/02
[52] U.S. Cl. ...................................... 65/107; 65/273; 65/287
[58] Field of Search ................ 65/107, 273, 287, 289, 65/286, 288, 275

[56] References Cited

FOREIGN PATENT DOCUMENTS 674,495  6/1952  United Kingdom ...................... 65/287

Primary Examiner—Arthur D. Kellogg
Attorney, Agent, or Firm—John E. Wagner

[57] ABSTRACT

A process and apparatus for holding and forming a sheet of thermo-plastic material particularly optical or mirror grade glass to a precise dimension with contact only on one face thereof and capable of applying forming stress uniformly to the plastic body with a minimum of contact with the faces of the blank. The device which may be inserted into a tunnel oven or the like includes a female cavity conforming to the precise shape to which the thermo-plastic material is to be formed. The female cavity is positioned at an angle with respect to the vertical and includes an edge lip on the lower extremity against which a flat blank of material to be formed may rest over the cavity. A generally planar mold cover includes an edge hook which engages the opposite or upper edge of the blank. The entire assembly is inserted into an oven and the oven elevated to the softening temperature of the plastic blank. The edge force applied to the blank due to the weight of the mold cover causes the upper edge to move downward as the blank sags. The edge-only forming force is transmitted throughout the blank to bring its lower surface into precise engagement with the female mold below.

7 Claims, 10 Drawing Figures

| PLACE BLANK IN MOLD SUPPORTED AT LOWER EDGE AND RESTING ON UPPER EDGE REGION OVER FEMALE MOLD |
| --- |
| APPLING DOWNWARD FORCE TO UPPER EDGE OF BLANK |
| HEATING BLANK WITH DOWNWARD FORCE APPLIED |
| COOLING BLANK AS FORMED |
| REMOVE DOWNWARD FORCE |

4,105,429

METHOD AND APPARATUS FOR PRECISION FORMING OF PLASTIC MATERIALS SUCH AS GLASS TO PRECISE DIMENSIONS FROM SHEET MATERIAL

BACKGROUND OF THE INVENTION

With the tremendous interest in the development of solar energy, the design and development of solar energy collectors has proceeded in the last few years at an ever expanding rate. One overall limitation that has been encountered is in the cost of such devices. In the case of flat plate collectors, not only the cost and size of such devices has been a limitation but their efficiency is relatively low at best for a number of reasons. Suffice it to say it has been determined of late that the solar concentrator which in its simplest form is a parabolic or parabolic section mirror in combination with a collector medium located in a vessel at the focus or the line of focus of the mirror, has many advantages over the flat plate collector. One serious disadvantage, however, to the solar concentrator is that for any significant efficiency to occur, the parabolic mirror used must be of near optical quality with respect to its form and dimensional accuracy and stability. Of course, in the production of reflectors for light sources where only one reflector is required, the various methods such as electroforming are available to produce a highly accurate mirror.

It has been recognized that if it were possible to form a conventional back surface glass mirror to the suitable parabolic shape at a minimum cost, the basic problems of the solar concentrator may be met and solved. Heretofore, composite mirrors have been produced including for example honeycomb support structures, or electro-formed or electro-deposited mirrors with front surfacing. None of these approaches have provided a satisfactory result. Another factor of great significance is that if a simple self supporting rear surface glass mirror can be achieved, the total weight as well as cost of solar concentrators can be reduced. Another factor mitigating in favor of the rear surface glass mirror is that a rear surface mirror is less subject to damage and may be cleaned to remove dust as simply as washing a window.

One limitation which has been encountered in attempts to form rear surface glass mirrors has been the lack of accuracy using conventional production techniques.

Under the auspices of the National Aeronautical & Space Commission, a significant improvement in the production of mirrors from domestic or home grade rear surface glass mirror blanks has been achieved employing the precision grinding of a foamed glass backing followed by pressure distortion and adhesive bonding of a thin glass mirror to the surface of the foam glass backing. This again has required optical grinding of the backing.

Non-planar glass optical elements have been produced in the past by glass sagging into a female cavity due to the weight of the glass or by positive forming pressure to the upper side of the glass blank.

BRIEF DESCRIPTION OF THE INVENTION

I have devised a method and apparatus which allows the production from mirror glass as thick as ¼ inch of precise optical quality semi-parabolic and parabolic mirrors in a simple one step process with virtually no contact with the faces of the mirror. This involves the use of a single concave female mold which is positioned at an incline with an edge lip at the lower edge. A mirror blank is positioned over the inclined mirror with the side adjacent to the female mold. A weight member which may be of planar shape but the shape of which is not critical, includes an edge hook conforming with the upper edge of the mirror blank and having sufficient weight, e.g. 50 pounds for a 2′ × 3′ mirror or the like, to aid in the forming of the shaped mirror. The assembly including the female mold, mirror blank and the weight member are introduced into a furnace which is elevated to the mirror's softening temperature. As heated, the mirror sags under its own weight and is brought into precise registry with the inner surface of the female mold by reason of the edge pressure of the weight member. As the mirror sags into the mold, the weight member moves downward at an inclined angle between the edges of the female mold and no surface pressure other than that of contact between the mirror silvered surface and the female mold exactly as desired, occurs.

The process particularly adapted to the production of semi-elongated, semi-parabloid sections, may be applied to parabolas in general. The glass blank may be formed into the shape either before or after silvering.

BRIEF DESCRIPTION OF THE DRAWING

This invention may be more clearly understood from the following detailed description and by reference to the drawing in which.

DETAILED DESCRIPTION OF THE INVENTION

Figure 1:
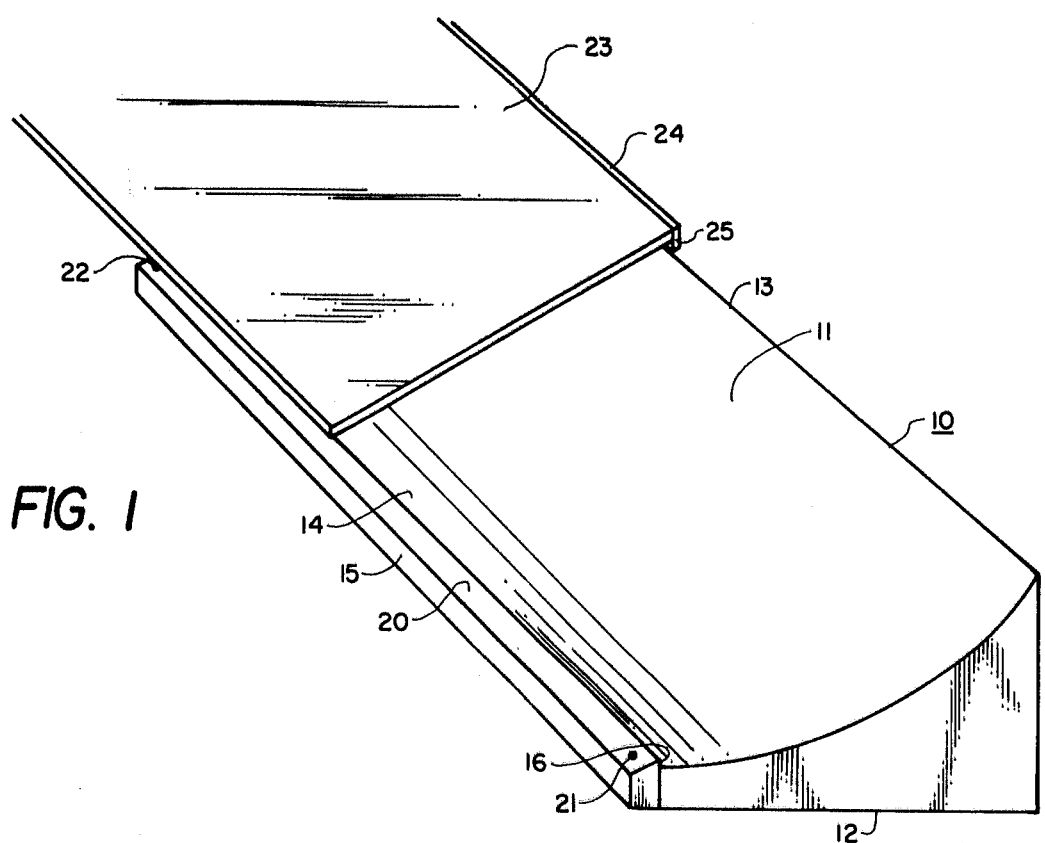
FIG. 1 is a perspective view of the mold and weight assembly of this invention shown in exploded form.
Figure 5:
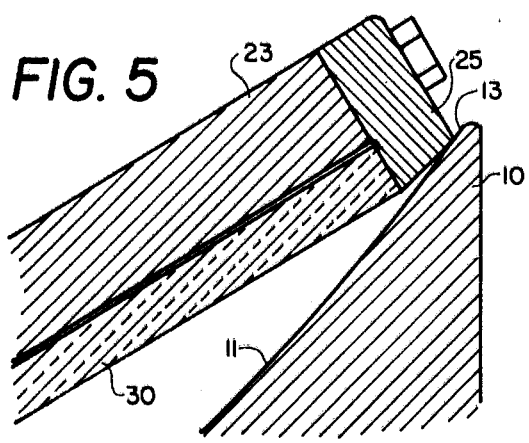
FIG. 5 is an enlarged fragmentary vertical sectional view through the upper corner of this apparatus prior to mirror blank formation.
Figure 7:
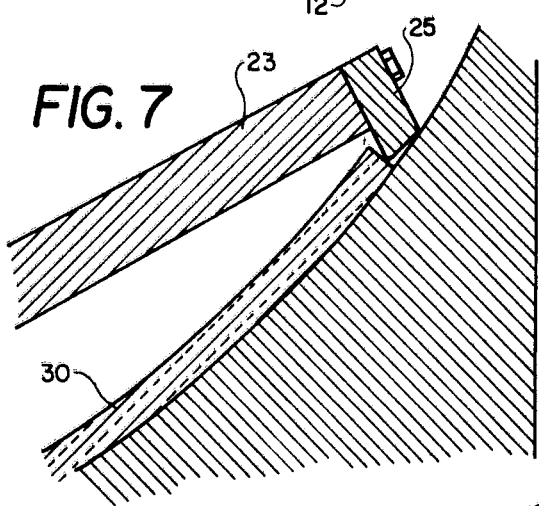
FIG. 7 is a fragmentary view similar to FIG. 5 at the completion of mirror blank formation.

The apparatus employed in carrying out this invention involves basically a mold 10 of good thermal conducting material such as cast iron or steel having an optically ground female cavity 11 in the configuration sought. In this case, it is a continuous section of semi-parabolic shape. The mold 10 may be a solid single piece or made up of a cavity plate reinforced by a number of ribs. In the case shown, the mold 10 is a solid member with a base surface 12 designed to maintain one edge 13 of the mold elevated above the second edge region 14. The mold 10 includes an edge plate 15 defining an angular stop 16 at the edge region 14 of the mold cavity. The upper surface 20 of plate 15 is machined to an angle whereby it is coplanar with the edge 13 of the mold 10. A number, for example two, of friction reducing elements 21 and 22 are located on the surface 20. The friction reducing elements here employed are ball bearings suitably lubricated and retained within recessed in the surface 20 with a portion extending above the surface 20.

The assembly also includes a top plate 23 similarly of cast iron or steel plate. The configuration and surface smoothness of the plate 23 are of little concern, only that the plate be reasonably flat and have sufficient weight, e.g. 25 pounds or greater to produce a properly formed mirror from a blank 18 inches by 30 inches. Plate 23 includes edge member 24 with continuous depending lip 25. As shown in FIG. 1, the lip 25 is lifted above the mold 10 and not in its operational position. The plate 23 has sufficient flatness on its underside that when in proper position, its underside will engage the two friction reducing devices 21 and 22 for easy movement. The lower surface of lip 25 is ground smooth in order to allow low friction movement along the mold cavity surface 11. The underside of the lip 25 may employ friction reducing devices such as ball bearings 21 and 22 but this has not been found to be necessary.

Figure 6:
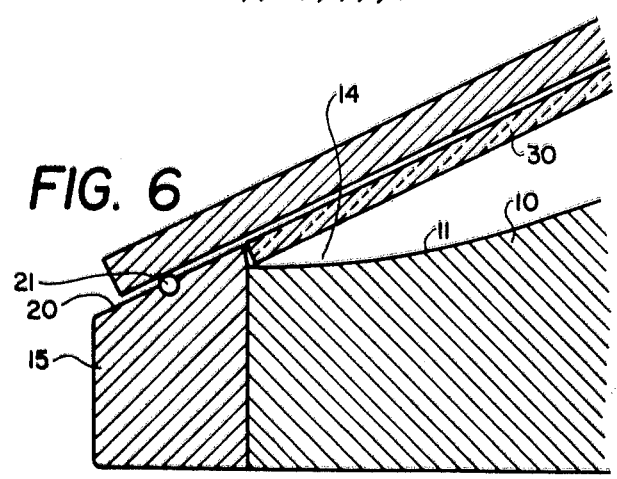
FIG. 6 is a fragmentary vertical sectional view through the lower corner of the apparatus of this invention prior to mirror blank formation.
Figure 8:
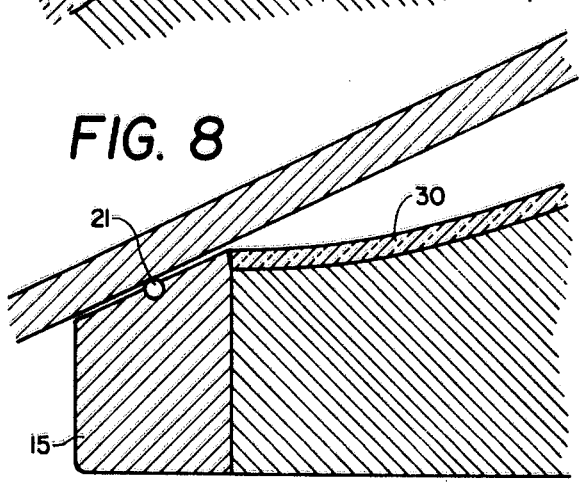
FIG. 8 is a view similar to FIG. 6 at the completion or formation of a mirror blank.
Figure 2:
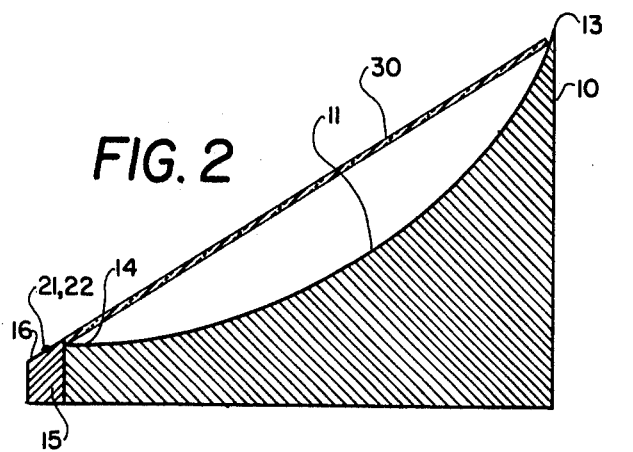
FIG. 2 is a vertical section through the mold of FIG. 1 with a blank in place prior to forming.
Figure 3:
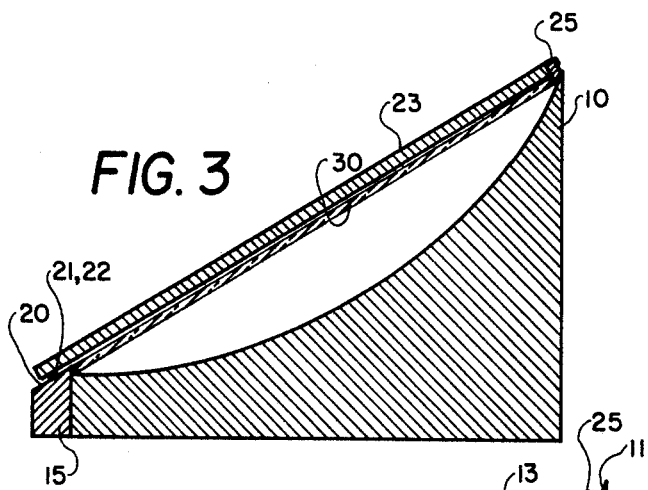
FIG. 3 is a vertical section similar to FIG. 2 during the process of mirror forming.
Figure 4:
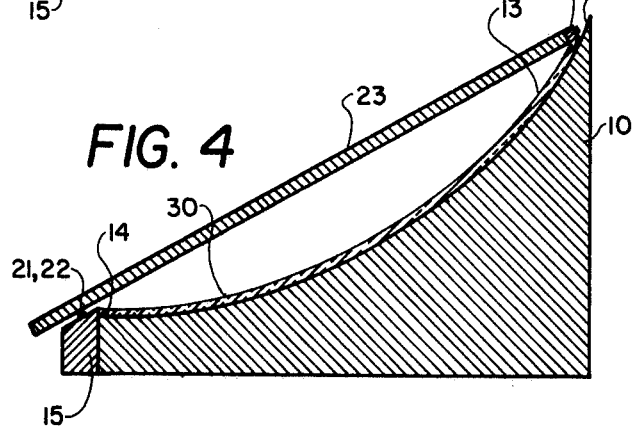
FIG. 4 is a vertical section through the mold assembly at the completion of mirror formation.
Figure 9:
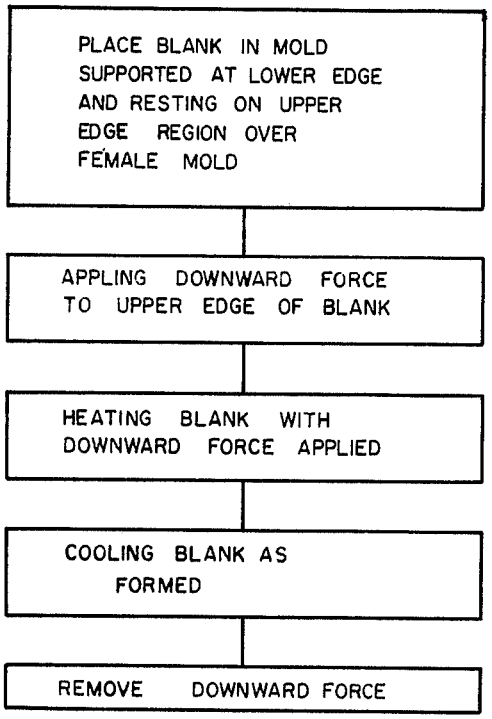
FIG. 9 is a process chart of the process of this invention.

The use of the apparatus of FIG. 1 is more clearly illustrated in the sequential FIGS. 2-4 and in greater detail FIGS. 5-8 showing the semi-parabolic formation of a mirror blank. In FIGS. 2 and 6 the female mold 10 is seen with its semi-parabolic section cavity 11 and the end stop 15 with its frictional reducing elements 21 and 22 extending slightly above the surface 20. A mirror blank 30 constituting a rectangular sheet of glass on the order of ⅛ to ⅜ inch in thickness is positioned with its major dimensions resting at one side of the angle formed by the stop 15 and the lower edge region 14 of the female cavity 11. The upper edge of the mirror blank 30 rests against the female cavity surface 11 near the upper end region 13, best seen in FIG. 5.

In FIG. 3, the cover 23 is positioned over the mirror blank 30 with its under side in contact with friction reducing elements 21 and 22 at the bottom and lip 25 resting against the upper edge of mirror blank 30. The only contact made with the mirror blank is at the lower edge by stop 15 and at the upper edge by lip 25 and sometimes the cavity surface 11. The upper surface of the blank 30 is separated from the lower surface of the cover 23 by a distance related to the extent the friction reducing elements 21 and 22 appear above the surface 20.

The application of heat to an assembly including mold 10, cover 23 and blank 30, for example, by inserting the entire assembly into an oven and elevating the oven to the softening temperature of the mirror material, the mirror blank 30 will sag of its own weight as is well known in accordance with glass sagging procedures. However, the sagging into intimate contact with the female mold surface is insured by the gravity induced movement of the cover 23 applying edge pressure only to the mirror blank 30 with its own edge lip 25 moving downward along the surface of the cavity 11. This movement is smooth and continuous due in part to the friction reducing elements 21 and 22. The only pressure applied to the mirror blank is to its edges, namely the lower edge at the edge region 14 and the upper edge at the edge 13. When the blank touches the female cavity surface 11, it is supported thereby and provided the temperature of the oven or heating is not elevated beyond the softening point, the blank 30 will assume the precise curvature of the surface 11 and the molding process will self terminate. When removed from the oven, the thermal inertia of the relatively massive mold 10 allows the slow cooling and minimization of stress within the mirror blank. When the cover 23 is removed the mirror shape 30 may be lifted out and then proceed with normal cleaning and silvering steps.

Figure 10:
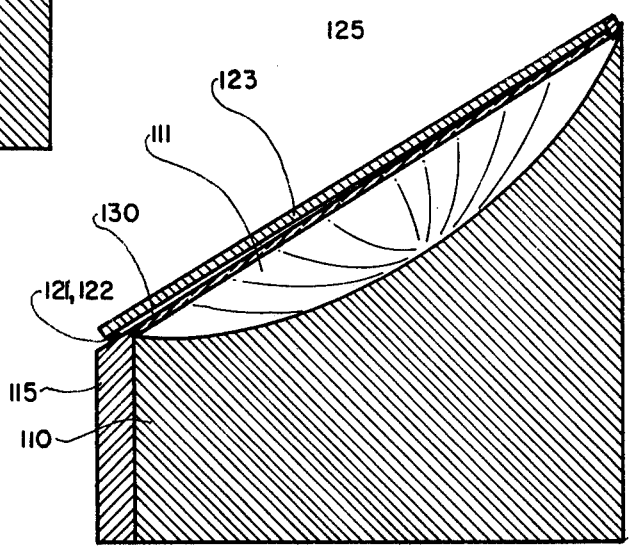
FIG. 10 is a vertical diametrical sectional view through dish mirror forming apparatus.

In the embodiments of FIGS. 1-8, this apparatus as shown is designed to produce an elongated section of a semi-parabolic shape. It is possible to produce other shapes although the semi-parabolic section has a particular advantage since is employs a particularly simple blank shape in either rectangle or square and has a continuous straight line edge for ease of application of edge pressure. It is possible, however, to produce shapes constituting revolutions such as a true parabola in which the female die is parabolic in shape and inclined again as in the case of the apparatus of FIG. 1. In this case, however, the edge lip of the weight or cover is semi-circular and assembling the stop is semi-circular. This arrangement is shown in FIG. 10. Each of the elements corresponding to an element in the combination of FIGS. 1-8 bears the similar reference numeral in FIG. 10 only preceeded by the hundreds digit 1. The cavity 111, the stop 115 and the edge lip 125 are of circular configuration and the cavity 11 is parabolic or of other circular sectional shape as may be desired. Again, the mold is inclined at an angle whereby gravitational force applied to the member 123 is transferred to the blank on the upper edge, e.g. 60° - 180° of its circumference thereby aiding the sag forming into the cavity 111.

The above described embodiments of this invention are merely descriptive of its principles and are not to be considered limiting. The scope of this invention instead shall be determined from the scope of the following claims including their equivalents.

What is claimed is:

1. Apparatus for sag forming of thermoplastic materials comprising;
   a mold member defining an inclined cavity into which a blank of thermoplastic material may be sag formed including a stop at a lower edge thereof;
   a weight member supportable above said cavity in part by contact with a lower portion of said mold member;
   said weight member including an elongated edge portion for engaging an upper edge of a blank positioned over said cavity to apply edge pressure thereto;
   said elongated edge of said weight member extending into contact with the surface of said mold member defining said cavity to move downward along said mold member responsive to gravitational force.

2. The combination in accordance with claim 1 wherein said lip only of said weight member contacts a blank to be formed.

3. The combination in accordance with claim 1 wherein said mold body and cavity are elongated and said stop constitutes a longitudinally extending member defining an edge of said cavity.

4. The combination in accordance with claim 3 wherein said weight member is elongated and said depending lip is positioned to rest on the surface of said cavity for gravitational responsive movement into said cavity responsive to sagging of a blank positioned over said cavity.

5. The combination in accordance with claim 4 including friction reducing elements on said inclined surface in contact with said weight member for low friction movement of said weight member responsive to sagging of said blank.

6. The process for sag forming thermoplastic shapes from substantially planar blanks comprising:
   positioning a mold cavity on an incline;
   laying a thermoplastic blank over the mold cavity with the lowermost edge thereof restrained from movement responsive to gravitational force;
   applying the pressure of a weight to substantially the entire edge of the blank opposite the lowermost edge while heating said blank, said weight being in slidable engagement with the mold cavity whereby the blank sags into the cavity under its own weight plus the edge pressure applied thereto by said weight; and
   cooling the formed blank.

7. The combination in accordance with claim 6 wherein the application of edge pressure to the blank is the result of gravitational force acting on said weight located above the blank and in contact therewith.

* * * * *